(12) United States Patent
Zeng (10) Patent No.: US 11,189,834 B1
(45) Date of Patent: Nov. 30, 2021

(54) MULTIPLE ELECTROLYTE BATTERY CELLS

(71) Applicant: Apple Inc., Cupertino, CA (US)

(72) Inventor: Qingcheng Zeng, San Jose, CA (US)

( * ) Notice: Subject to any disclaimer, the term of this patent is extended or adjusted under 35 U.S.C. 154(b) by 364 days.

(21) Appl. No.: 16/038,865

(22) Filed: Jul. 18, 2018

Related U.S. Application Data

(60) Provisional application No. 62/543,229, filed on Aug. 9, 2017.

(51) Int. Cl.
| | |
|---|---|
| *H01M 8/18* | (2006.01) |
| *H01M 50/409* | (2021.01) |
| *H01M 50/183* | (2021.01) |
| *H01M 4/66* | (2006.01) |
| *H01M 4/02* | (2006.01) |
| *H01M 4/583* | (2010.01) |
| *H01M 4/04* | (2006.01) |

(Continued)

(52) U.S. Cl.
CPC ......... *H01M 4/661* (2013.01); *H01M 4/0404* (2013.01); *H01M 4/583* (2013.01); *H01M 8/188* (2013.01); *H01M 10/0525* (2013.01); *H01M 10/38* (2013.01); *H01M 10/425* (2013.01); *H01M 10/441* (2013.01); *H01M 50/183* (2021.01); *H01M 50/409* (2021.01); *H01M 2004/027* (2013.01); *H01M 2004/028* (2013.01); *H01M 2200/00* (2013.01)

(58) Field of Classification Search
CPC .... H01M 4/661; H01M 10/38; H01M 10/441; H01M 4/583; H01M 2/08; H01M 8/188; H01M 2/16; H01M 10/425; H01M 10/0525; H01M 4/0404; H01M 2004/028; H01M 2010/4271; H01M 2004/027; H01M 2200/00; H01M 50/183; H01M 50/409; H02H 3/087

See application file for complete search history.

(56) References Cited

U.S. PATENT DOCUMENTS

| | | |
|---|---|---|
| 4,374,186 A | 2/1983 | McCartney et al. |
| 4,567,119 A | 1/1986 | Lim |

(Continued)

FOREIGN PATENT DOCUMENTS

| | | |
|---|---|---|
| CN | 101809801 A | 8/2010 |
| CN | 102005566 A | 4/2011 |

(Continued)

OTHER PUBLICATIONS

U.S. Appl. No. 15/742,009, "Non-Final Office Action", dated Nov. 15, 2019, 14 pages.

(Continued)

*Primary Examiner* — Kwang Han
(74) *Attorney, Agent, or Firm* — Kilpatrick Townsend & Stockton (57) ABSTRACT

Energy storage devices, battery cells, and batteries of the present technology may include a first current collector and a second current collector. Exemplary battery cells may also include a first region defined between the first current collector and the second current collector. The first region may include electrode materials. The battery cells may also include a second region defined between the first current collector and the second current collector. The second region may be fluidly isolated from the first region. The second region may include an electrolyte.

20 Claims, 6 Drawing Sheets

(51) Int. Cl.
H01M 10/44 (2006.01)
H01M 10/42 (2006.01)
H01M 10/38 (2006.01)
H01M 10/0525 (2010.01)

(56) References Cited

U.S. PATENT DOCUMENTS

| | | | |
|---|---|---|---|
| 5,162,172 A | 11/1992 | Kaun | |
| 5,254,415 A | 10/1993 | Williams et al. | |
| 5,367,431 A | 11/1994 | Kunishi et al. | |
| 6,004,698 A * | 12/1999 | Richardson | H01M 10/052 |
| | | | 429/305 |
| 8,124,266 B2 | 2/2012 | Yamazaki | |
| 8,357,469 B2 | 1/2013 | Shaffer, II et al. | |
| 9,142,811 B2 | 9/2015 | Chami | |
| 10,916,741 B1 | 2/2021 | Dafoe et al. | |
| 10,916,796 B1 | 2/2021 | Zeilinger et al. | |
| 10,923,728 B1 | 2/2021 | Zeng | |
| 2002/0146620 A1 | 10/2002 | Connell | |
| 2003/0027051 A1 | 2/2003 | Kehja et al. | |
| 2003/0096170 A1 | 5/2003 | Fujiwara et al. | |
| 2005/0106456 A1 | 5/2005 | Puester et al. | |
| 2007/0210760 A1 | 9/2007 | Shimamura et al. | |
| 2009/0023059 A1 | 1/2009 | Kinoshita et al. | |
| 2009/0068531 A1 | 3/2009 | Sawa et al. | |
| 2009/0136832 A1 | 5/2009 | Aihara et al. | |
| 2009/0233175 A1 | 9/2009 | Kelley et al. | |
| 2010/0134942 A1 | 6/2010 | Wang et al. | |
| 2011/0294007 A1 | 12/2011 | Hosaka et al. | |
| 2012/0156552 A1 | 6/2012 | Miyazaki et al. | |
| 2012/0189896 A1 | 7/2012 | Zhou et al. | |
| 2013/0065106 A1 | 3/2013 | Faust et al. | |
| 2013/0089774 A1 | 4/2013 | Chami | |
| 2015/0325894 A1 | 11/2015 | Merriman et al. | |
| 2016/0049679 A1 | 2/2016 | Stevens et al. | |
| 2016/0099456 A1 | 4/2016 | Kwon et al. | |
| 2016/0111729 A1 | 4/2016 | Kim et al. | |
| 2016/0197352 A1 | 7/2016 | Blaser et al. | |
| 2016/0248113 A1 | 8/2016 | He et al. | |
| 2016/0329535 A1* | 11/2016 | Moomaw | B29C 65/18 |
| 2017/0214057 A1 | 7/2017 | Kotik et al. | |
| 2018/0013144 A1 | 1/2018 | Li et al. | |
| 2018/0226654 A1 | 8/2018 | Ohsawa et al. | |

FOREIGN PATENT DOCUMENTS

| | | | |
|---|---|---|---|
| CN | 102272977 A | 12/2011 | |
| CN | 103165920 A | 6/2013 | |
| CN | 103222098 A | 7/2013 | |
| CN | 103548196 A | 1/2014 | |
| CN | 103904294 A | 7/2014 | |
| CN | 107851747 A | 3/2018 | |
| EP | 1125336 A1 | 8/2001 | |
| EP | 2892097 A1 | 7/2015 | |
| EP | 3435473 A1 | 1/2019 | |
| JP | 06503442 A | 4/1994 | |
| JP | 2005005163 A | 1/2005 | |
| JP | 2006012556 A | 1/2006 | |
| JP | 2007012584 A | 1/2007 | |
| JP | 2011071011 A | 4/2011 | |
| JP | 4857710 B2 | 1/2012 | |
| JP | 2012234823 A | 11/2012 | |
| JP | 2013114746 A | 6/2013 | |
| JP | 2013187074 A | 9/2013 | |
| JP | 5410822 B2 | 2/2014 | |
| JP | 2014029818 A | 2/2014 | |
| JP | 2018519646 | 7/2018 | |
| KR | 20130066795 A | 6/2013 | |
| WO | 8504287 A1 | 9/1985 | |
| WO | 9210861 A1 | 6/1992 | |
| WO | 2010111087 A1 | 9/2010 | |
| WO | 2016031689 A1 | 3/2016 | |
| WO | 2017007827 | 1/2017 | |
| WO | 2017007827 A1 | 1/2017 | |
| WO | WO 2017/007827 * | 1/2017 | H01M 2/08 |
| WO | 2018057566 A1 | 3/2018 | |
| WO | 2018195372 A1 | 10/2018 | |
| WO | 2018213601 A2 | 11/2018 | |

OTHER PUBLICATIONS

Japan Patent Appl. No. 2018-500449, "Notice of Decision to Grant", dated Nov. 18, 2019, 2 pages.
PCT/US2018/033218, "International Preliminary Report on Patentability", dated Nov. 28, 2019, 9 pages.
Europe Patent Application No. 16738994.9, "Communication Pursuant to Rules 161(1) and 162 EPC", dated Mar. 23, 2018, 3 pages.
Japan Patent Application No. 2018-500449, "Office Action", dated Jan. 21, 2019, 12 pages.
PCT/US2016/041151, "International Preliminary Report on Patentability", dated Jan. 18, 2018, 8 pages.
PCT/US2016/041151, "International Search Report and Written Opinion", dated Aug. 25, 2016, 10 pages.
PCT/US2017/052413, "International Search Report and Written Opinion", dated Feb. 1, 2018, 19 pages.
PCT/US2017/052413, "Invitation to Pay Additional Fees", dated Dec. 8, 2017, 14 pages.
PCT/US2018/028472, "International Search Report and Written Opinion", dated Jul. 27, 2018, 13 pages.
PCT/US2018/033218, "International Search Report and Written Opinion", dated Nov. 16, 2018, 13 pages.
U.S. Appl. No. 15/742,009, "Restriction Requirement", dated Jun. 11, 2019, 8 pages.
U.S. Appl. No. 16/108,498, "Non-Final Office Action", dated Apr. 30, 2020, 28 pages.
U.S. Appl. No. 16/273,625, "Non-Final Office Action", dated May 4, 2020, 54 pages.
U.S. Appl. No. 16/007,534, "Non-Final Office Action", dated May 5, 2020, 47 pages.
U.S. Appl. No. 15/962,133, "Non-Final Office Action", dated Jan. 21, 2020, 37 pages.
U.S. Appl. No. 16/049,250, "Non-Final Office Action", dated Apr. 8, 2020, 8 pages.
Chinese Patent Application No. 201680039891.9, "Office Action", dated Jun. 10, 2020, 18 pages.
U.S. Appl. No. 16/263,890, "Non-Final Office Action", dated Jun. 16, 2020, 9 pages.
U.S. Appl. No. 15/962,133, "Final Office Action", dated Jul. 7, 2020, 23 pages.
U.S. Appl. No. 15/742,009, "Final Office Action", dated Aug. 19, 2020, 13 pages.
International Patent Application No. PCT/US2017/052413, "International Preliminary Report on Patentability", dated Apr. 4, 2019, 12 pages.
Korean Patent Application No. 10-2018-7000263, "Office Action", dated Feb. 28, 2019, 5 pages.
U.S. Appl. No. 16/108,522, "Non-Final Office Action", dated Sep. 9, 2020, 10 pages.
European Patent Application No. 16738994.9, "Notice of Decision to Grant", dated Sep. 24, 2020, 2 pages.
U.S. Appl. No. 16/049,250, "Notice of Allowance", dated Oct. 7, 2020, 22 pages.
U.S. Appl. No. 16/108,503, "Non-Final Office Action", dated Oct. 2, 2020, 61 pages.
Korea Patent Application No. 10-2018-7000263, "Office Action", dated Sep. 27, 2019, 16 pages.
PCT/US2018/028472, "International Preliminary Reporton Patentability", dated Oct. 31, 2019, 10 pages.
U.S. Appl. No. 15/742,009, "Non-Final Office Action", dated Nov. 30, 2020, 13 pages.
U.S. Appl. No. 15/962,133, "Notice of Allowance", dated Feb. 9, 2021, 8 pages.
U.S. Appl. No. 16/007,534, "Notice of Allowance", dated Nov. 18, 2020, 7 pages.
U.S. Appl. No. 16/108,498, "Final Office Action", dated Dec. 9, 2020, 25 pages.

(56) References Cited

OTHER PUBLICATIONS

U.S. Appl. No. 16/108,522, "Notice of Allowance", dated Feb. 26, 2021, 8 pages.
U.S. Appl. No. 16/263,890, "Notice of Allowance", dated Oct. 23, 2020, 8 pages.
U.S. Appl. No. 16/273,625, "Final Office Action", dated Feb. 16, 2021, 14 pages.
China Patent Application No. 201680039891.9, "Office Action", dated Oct. 27, 2020, 8 pages.
PCT/US2020/060348, "International Search Report and Written Opinion", dated Mar. 12, 2021, 9 pages.
PCT/US2020/060350, "International Search Report and Written Opinion", dated Mar. 12, 2021, 12 pages.
Weng, et al., "Three-Electrolyte Electrochemical Energy Storage Systems Using Both Anion- and Cation-Exchange Membranes as Separators", Energy, vol. 167, Jan. 15, 2019, pp. 1011-1018.

\* cited by examiner

MULTIPLE ELECTROLYTE BATTERY CELLS

CROSS-REFERENCE TO RELATED APPLICATION

This application claims the benefit of U.S. Application Ser. No. 62/543,229 filed Aug. 9, 2017, the entire disclosure of which is hereby incorporated by reference in its entirety for all purposes.

TECHNICAL FIELD

The present technology relates to batteries and battery components. More specifically, the present technology relates to battery cell structures and uses.

BACKGROUND

In battery-powered devices, batteries may sometimes include overcurrent protection features. While protecting the cell from overcurrent events, the features may be complex and can limit materials available for the cell, or occupy area that could otherwise be used for additional active material.

SUMMARY

The present technology relates to energy storage devices, including battery cells and batteries, that include an additional electrolyte system for providing overcurrent protection. These additional electrolytes may utilize redox reactions to protect cell components from excess voltage. The electrolyte materials may be included within individual cell structures to provide protection at the level of individual cells as will be described throughout the disclosure.

Energy storage devices, battery cells, and batteries of the present technology may include a first current collector and a second current collector. Exemplary battery cells may also include a first region defined between the first current collector and the second current collector. The first region may include electrode materials. The battery cells may also include a second region which may be defined between the first current collector and the second current collector. The second region may be fluidly isolated from the first region. The second region may include an electrolyte.

In some embodiments, the battery cells may further include a separator extending through both the first region and the second region. The battery cells may further include a seal at least partially defining the first region and the second region. The second region may be positioned laterally external to the first region, and the seal may define an exterior of the first region and an interior of the second region. The seal may define sidewalls of the second region. Along with the first current collector and the second current collector, the seal may define a cavity within the second region. The seal may define a plurality of separate cavities fluidly isolated from one another and located external to the first region. The electrode materials may include a cathode active material and an anode active material contained within and limited to the first region. The first region may include a first electrolyte, and the second region may include a second electrolyte different from the first electrolyte. The second electrolyte may be configured to remain passive at operating voltages below or about 4.0 V. The second electrolyte may be configured to be electrically activated at operating voltages above or about 4.0 V. The second region may define a plurality of separate cavities fluidly isolated from one another. A first fluid cavity of the plurality of fluid cavities may contain an electrolyte configured to remain passive at operating voltages below or about 4.0 V. A second fluid cavity of the plurality of fluid cavities may contain an electrolyte configured to remain passive at operating voltages below or about 4.3 V. The first current collector and the second current collector may electrically couple the first region and the second region.

The present technology also encompasses batteries. The batteries may include a first battery cell including a first current collector. The first battery cell may include a second current collector. The first battery cell may include a first region defined between the first current collector and the second current collector. The first battery cell may also include a second region defined between the first current collector and the second current collector. The second region may be fluidly isolated from the first region, and the second region may include a redox electrolyte. The batteries may also include a second battery cell. The second battery cell may include a third current collector. The second battery cell may include a fourth current collector. The second battery cell may include a third region defined between the third current collector and the fourth current collector. The second battery cell may also include a fourth region defined between the third current collector and the fourth current collector. The fourth region may be fluidly isolated from the third region, and the fourth region may include a redox electrolyte similar to or different from the redox electrolyte of the first battery cell.

In some embodiments, the first region and the third region may be interior regions of the first battery cell and the second battery cell. The second region and the fourth region may be exterior regions of the first battery cell and the second battery cell. The batteries may further include a first separator incorporated within the first battery cell and positioned between the first current collector and the second current collector. The batteries may further include a second separator incorporated within the second battery cell and positioned between the third current collector and the fourth current collector. The first separator may extend across each of the first region and the second region, and the second separator may extend across each of the third region and the fourth region. The second region may be vertically offset from the fourth region within the battery. The second region may be electrically coupled with the first region by the first current collector and the second current collector. The fourth region may be electrically coupled with the third region by the third current collector and the fourth current collector. The second region and the fourth region may be electrically isolated from one another.

The present technology also encompasses methods of balancing a battery. The methods may include delivering current to the battery from a voltage source. The battery may include a first battery cell including a first current collector and a second current collector. The first battery cell may include a first region defined between the first current collector and the second current collector. The first battery cell may also include a second region defined between the first current collector and the second current collector. The second region may be fluidly isolated from the first region, and the second region may include a redox electrolyte. The battery may also include a second battery cell including a third current collector and a fourth current collector. The second battery cell may include a third region defined between the third current collector and the fourth current collector. The second battery cell may also include a fourth region defined between the third current collector and the fourth current collector. The fourth region may be fluidly isolated from the third region. The fourth region may include the redox electrolyte. The first battery cell may be characterized by a charge level higher than a charge level of the second battery cell.

The methods may include supplying additional current to the first battery cell and the second battery cell. The additional current may increase the voltage within the first battery cell to a voltage threshold of the redox electrolyte in the first battery cell. The methods may also include charging the second battery cell to an equivalent level of the first battery cell. In some embodiments, a voltage level within the first battery cell while supplying the additional current may be maintained at the voltage threshold of the redox electrolyte in the first battery cell until the second battery cell is charged to a level associated with a fully charged battery cell.

Such technology may provide numerous benefits over conventional technology. For example, the present devices may provide overcurrent protection to each individual cell. Additionally, the described cell structures may provide ways of balancing cells within a battery. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, may be made from a variety of materials. These devices may include one or more safety features including overcurrent protection features that may protect the devices from battery issues or other failures. Overcurrent protection may have one or more components at a cell level as well as components or code at a battery management level. Conventional cells that are charged for a period of time above normal operating voltages may cause metal plating at the cathode, as well as reactions within the cell that may form gases increasing the pressure within the cell, compounding the issues. Some conventional rechargeable battery designs, such as some lithium-ion batteries, have incorporated redox shuttle additives into the electrolyte system of individual battery cells to help address this issue.

Electrolytes utilizing redox shuttle additives may provide an amount of overcurrent protection within an individual cell. For example, certain materials may be activated at a particular current or voltage above standard operating voltage of the cell. When the cell is overcharged, the current will begin to raise the voltage within the cell, which may cross a threshold to activate the shuttle additives allowing redox reactions to occur. The shuttle additives may be characterized by faster reaction than the lithium-containing species allowing the redox species to accept the increased current and limit reactions with the lithium-containing species. The shuttle additive may be oxidized at a higher voltage, and may lose an electron to the cathode of the cell. The redox additive cation produced will then diffuse to the anode to obtain a replacement electron and be reduced. The reversible reaction process can continue to occur to shuttle electrons between the two electrodes without causing damage to the electrode materials, such as forcing additional intercalation of lithium ions, or causing dendritic formation issues within a normal cell under overcharge conditions. Put another way, the redox shuttle additive may protect the cell by shunting the current between the positive and negative electrodes, which may maintain the voltage at the oxidation potential of the redox shuttle additives. This may protect the lithium-containing species and electrolyte materials during the overcurrent.

Although the additives may provide overcurrent protection, the redox shuttle materials may also pose issues within the cell. For example, the additives are conventionally added directly to the electrolyte mixture. The additives may be characterized by a greater molecular weight than the other components of the electrolyte, which may increase the viscosity of the electrolyte mixture. This increased viscosity may reduce the mobility of the materials within the electrolyte. The inclusion of the additives may also increase the conductivity of the electrolyte, and may restrict the materials that may be used for the electrolyte. For example, the additive would be required to couple with the different materials of the electrolyte, which may limit both the electrolyte materials and the additive materials to compatible compositions. These issues may reduce the life cycle of the battery substantially compared to cells that do not include redox shuttle additives within the electrolyte.

The present technology overcomes these issues by forming isolated locations within a battery cell to house a redox electrolyte. By locating the redox electrolyte separately from the electrolyte used with the electrodes, the issues noted above may be obviated. The electrolyte may be electrically coupled with an electrode region of the battery cell, which may allow the redox electrolyte to operate as overcurrent protection for the cell if exposed to excess voltage. Additionally, the present cell designs when used in multi-cell batteries may enable balancing of the individual cells utilizing similar mechanisms of the shuttle electrolyte in different charging schemes.

Although the remaining portions of the description will routinely reference lithium-ion batteries, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

Figure 1:
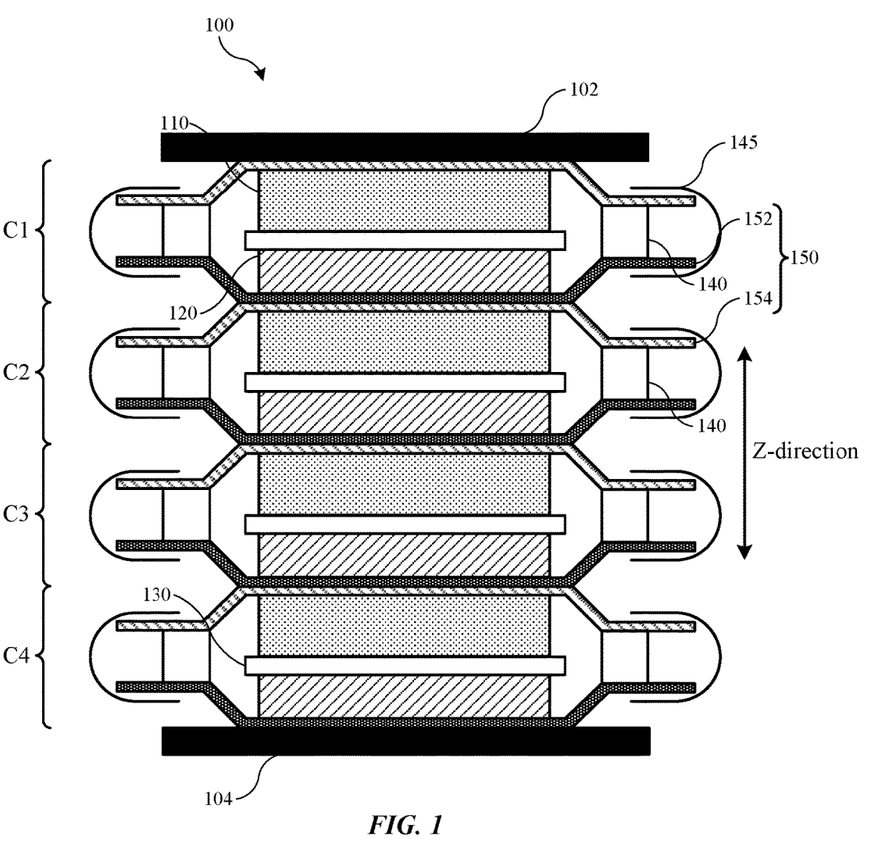
FIG. 1 shows a schematic cross-sectional view of an energy storage device according to embodiments of the present technology.

FIG. 1 depicts a schematic cross-sectional view of an energy storage device according to embodiments of the present technology. The energy storage devices may include a single current collector or coupled current collectors. The energy storage devices may operate in a conventional manner with regard to electronic flow across or through material layers, such as providing electronic mobility across an xy-plane of the current collectors. Additionally, the described devices may operate by electronic flow through the structure in a z-direction through individual cells as opposed to via tabbed current collectors as described above for conventional batteries.

As illustrated, the stacked battery 100 may include a stack of electrochemical cells C1, C2, C3, and C4 between end plates 102 and 104. End plates 102 and 104 may be metal current collector plates, which can serve both electrical and mechanical functions. In some embodiments, end plates 102 and 104 can be support plates that form part of an external housing of the stacked battery. End plates 102 and 104 may also provide mechanical support within a housing of the stacked battery. Some or all of the support plates may be electrically conductive, and there may be a terminal within the support plate that is electrically connected to the end plate. In embodiments an additional plate similar to end plates 102 and 104 may be disposed within the stack of cells, such as between two cells. This configuration including an additional plate may provide structural rigidity, and the additional plate may also preform electronic functions similar to end plates 102, 104. End plates 102 and 104 may act as positive and negative terminals of the battery. The cells may pass current in the z-direction through individual cells to the end plates, which may transfer current in any direction across the plate and from the battery.

The stack of electrochemical cells may include any number of electrochemical cells depending on the selected voltage for the stacked battery 100, along with the individual voltage of each individual electrochemical cell. The cell stack may be arranged with as many or as few electrochemical cells in series as desired, as well as with intervening plates for support and current transfer. The cells C may be positioned adjacent, e.g. abutting, one another in some configurations. Each electrochemical cell C may include a cathode 110 and an anode 120, where the cathode 110 and anode 120 may be separated by separator 130 between the cathode and anode. Between the anode 120 of cell C1 and the cathode of adjacent cell C2 may be a stacked current collector 150. The stacked current collector 150 may form part of C1 and C2. On one side, stacked current collector 150 may be connected to the seal 140 of C1 and connected on an opposing side to the seal 140 of C2.

In some embodiments, as shown in FIG. 1, stacked current collector 150 may include a first current collector 152 and a second current collector 154. In embodiments one or both of the current collectors may include a metal or a non-metal material, such as a polymer or composite. As shown in the figure, in some embodiments the first current collector 152 and second current collector 154 can be different materials. In some embodiments, the first current collector 152 may be a material selected based on the potential of the anode 120, such as copper or any other suitable metal, as well as a non-metal material including a polymer. The second current collector may be a material selected based on the potential of the cathode 110, such as aluminum or other suitable metals, as well as a non-metal material including a polymer. In other words, the materials for the first and second current collectors can be selected based on electrochemical compatibility with the anode and cathode active materials used.

The first and second current collectors can be made of any material known in the art. For example, copper, aluminum, or stainless steel may be used, as well as composite materials having metallic aspects, and non-metallic materials including polymers. In some instances the metals or non-metals used in the first and second current collector can be the same or different. The materials selected for the anode and cathode active materials can be any suitable battery materials. For example, the anode material can be silicon, graphite, carbon, a tin alloy, lithium metal, a lithium containing material, such as lithium titanium oxide (LTO), or other suitable materials that can form an anode in a battery cell. Additionally, for example, the cathode material can be a lithium-containing material. In some embodiments, the lithium-containing material can be a lithium metal oxide, such as lithium cobalt oxide, lithium manganese oxide, lithium nickel manganese cobalt oxide, lithium nickel cobalt aluminum oxide, or lithium titanate, while in other embodiments, the lithium-containing material can be a lithium iron phosphate, or other suitable materials that can form a cathode in a battery cell.

The first and second current collectors may have any suitable thickness, and may have a thickness that allows for a seal to be formed and provides suitable mechanical stability to prevent failure, such as breakage of the layers, during anticipated usage of the stacked battery. Additionally, the thickness of the current collectors can be sufficiently thin to allow for bending and flexing in the separation region to accommodate expansion anticipated during cycling of the stacked battery, including, for example, up to 10% expansion in the z-direction.

Figure 2:
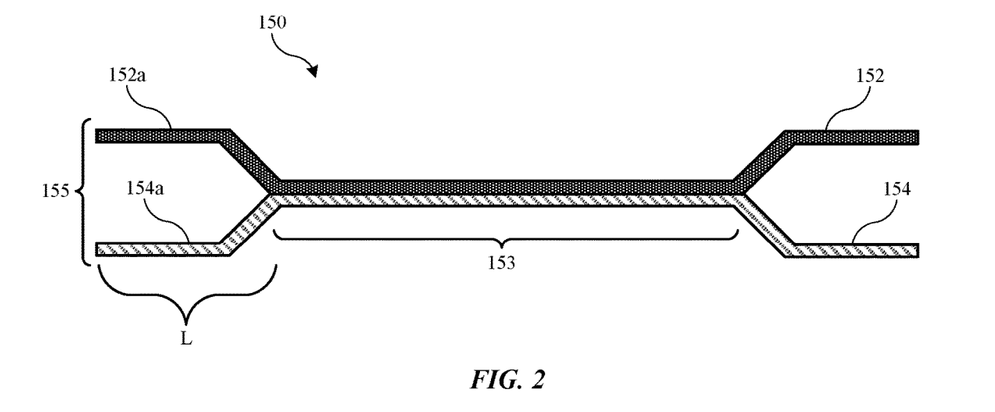
FIG. 2 shows a schematic cross-sectional view of a current collector according to embodiments of the present technology.

Turning to FIG. 2, the stacked current collector 150 may have a connection region 153 where the first current collector 152 and second current collector 154 may be connected, and a gap region 155 at the peripheral ends of the collector 150. In the connection region 153, the first current collector and second current collector may be in direct contact or otherwise joined to be electrically-conductive. In some embodiments, the first current collector and second current collector may be directly connected, while in other embodiments the first current collector and second current collector may be indirectly connected via a conductive material. To form the connection region 153, the first current collector 152 and the second current collector 154 may be laminated together. Additionally, the connection region 153 may be created by welding the first current collector 152 and the second current collector 154 together. The connection region 153 may also be created by using an adhesive, which may be electrically conductive, between the first current collector 152 and the second current collector 154. In other embodiments, the connection region 153 may be created by the wetting that can occur between the materials of the first current collector 152 and the second current collector 154.

In the gap region 155, the peripheral ends of the first current collector 152 and the second current collector 154 may be spaced apart and moveable relative to each other. As such, there may be a separation distance between the first and second current collectors, which may increase as the electrochemical cell swells. In some embodiments, the spaced apart peripheral ends of the first current collector 152 and the second current collector 154 may be of a length that is sufficient to accommodate an anticipated expansion of the individual electrochemical cells of the stacked battery during cycling of the battery. The peripheral ends of the current collectors 152a and 154a may have a length L, as shown in FIG. 2, which may be long enough that up to or at least about 10% expansion in the z-direction can be accommodated.

As shown in FIG. 1, each cell C1, C2, C3, and C4, also includes a seal 140, which, with the current collector layers, may electrochemically isolate the electrochemical cells from each other. Thus, each cathode-anode pair may be electrochemically sealed and isolated from neighboring electrochemical cells. Because the current collectors 152 and 154 may be separated at the peripheral ends, separate seals 140 can be formed on opposing sides, such as a top and bottom, of the stacked current collector 150. The seals 140 may be the same or different materials, and each seal 140 may also be a laminate, composite, or coupling of two or more materials in embodiments.

The seal material may be able to bond with the first and second layers of the stacked current collector to prevent electrolyte leakage. The seal material may be a polymer, an epoxy, or other suitable electrically-insulating material that can bond with first and second current collectors to create a seal, which may be a hermetic seal. In some embodiments, the polymer may be polypropylene, polyethylene, polyethylene terephthalate, polytrimethylene terephthalate, polyimide, or any other suitable polymer that may bond with the first and second current collectors of the stacked current collector to form a hermetic seal and may also provide resistance to moisture ingress. The electrolyte may be a solid, a gel, or a liquid in embodiments. The seal may electrochemically isolate each electrochemical cell by hermetically sealing the cell, thereby preventing ions in the electrolyte from escaping to a neighboring electrochemical cell. The seal material may be any material providing adequate bonding with the metal layers such that the seal may be maintained through a predetermined period of time or battery usage.

The separator may be wetted with the electrolyte, such as a fluid electrolyte or gel electrolyte, to incorporate the electrolyte into the stacked battery. Alternatively, a gel electrolyte may coat the separator. In still further alternatives, a gel electrolyte may coat the first metal layer and/or second metal layer before combination. Additionally, the electrolyte may be blended with particles of electrode active material. In various embodiments, incorporating the electrolyte into the components of the stacked battery may reduce gassing in the stacked battery. In variations that include a flexible seal, the stacked battery may accommodate gas resulting from degassing.

The individual electrochemical cells may be formed in any suitable manner. In some embodiments, the cathode 110, the anode 120, and the separator 130 may be preassembled. A first current collector 152 may then be connected to the anode while a second current collector 154 may be connected to the cathode to create a cell. The seal material may be disposed between the first current collector 152 and the second current collector 154 to form seals 140. Finally, the peripheral ends of the sealed electrochemical cell may be further taped to frame the cell. Tapes 145, as well as other coatings, sealing, or material layers, may be disposed around the outer perimeter of the metal layers and seals. The tape 145 may be substituted with ceramic or polymeric materials. Tape 145 may be included for various reasons including to prevent shorting to adjacent layers or to surrounding conductive surfaces within the device, to provide improved electrochemical or chemical stability, and to provide mechanical strength.

FIGS. 1 and 2 illustrate an exemplary stacked battery design according to the present technology. Additional configurations other than illustrated, or as variations on the designs, are also encompassed by the present technology. For example, certain embodiments may not include an additional seal material, and first current collector 152 and second current collector 154 may be directly coupled or bonded together. Additionally, the current collectors may include designs including combinations of polymer material and conductive materials, such as within a matrix.

An exemplary matrix for a current collector may include a polymer disposed as the matrix material or as part of the matrix material. The matrix may provide an insulative design that limits or reduces xy-directional conductivity. The polymer matrix may be developed with a conductive material to produce a current collector having particular electrochemical or composite properties, such as electrical conductivity in the z-direction or through the cell. For example, conductive particulate material may be incorporated within the matrix. The conductive material may include any of the conductive materials previously identified. In embodiments, the conductive material may include one or more of silver, aluminum, copper, stainless steel, and a carbon-containing material. In this way, the current collector may have a tuned resistivity to provide directional control for electrical conductivity. For example, the produced current collector may be configured to provide an in-plane resistivity across a length in the xy-plane, as well as a through-plane resistivity in the z-direction, which is greater than or about $1 \times 10^{-4}$ ohm-m in embodiments. Additionally, exemplary current collectors may have an in-plane and through-plane resistivity of between about $1 \times 10^{-3}$ ohm-m and about 1,000 ohm-m. In other embodiments, more conventional electrical distribution may be employed, where current is transferred along conductive current collectors into and out of the cell.

Figure 3:
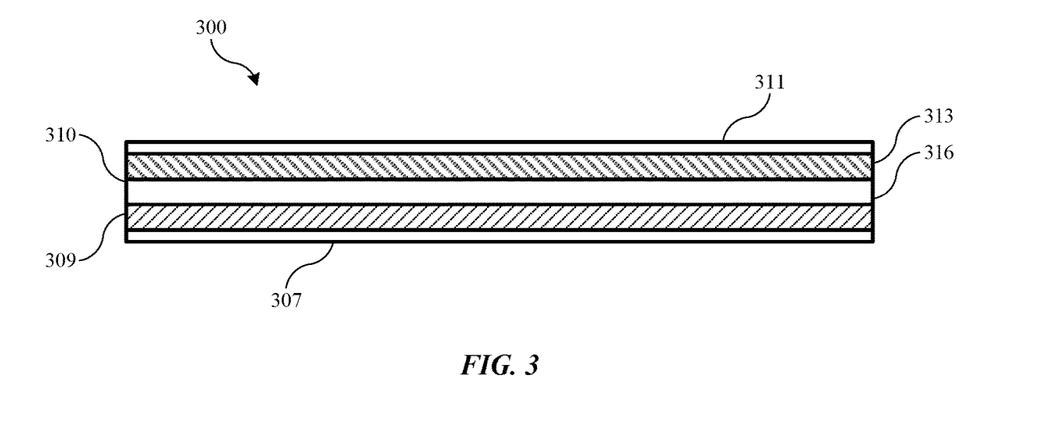
FIG. 3 shows a schematic cross-sectional view of an energy storage device according to embodiments of the present technology.

The present technology may also be applicable in other cell designs utilizing xy-plane current transfer. Turning to FIG. 3 is shown a schematic view of an energy storage device 300 according to embodiments of the present technology. Energy storage device 300 may be a battery cell or may be a composite battery. Energy storage device 300 may be characterized by a number of structural configurations including a cylindrical cell design, a jelly roll design, a pouch design, or a prismatic design, for example. As illustrated, energy storage device 300 may include battery cell material 310, which may be a jelly roll or layers of material stacked or overlapped in various configurations. The cell material 310 may be electrode materials for an anode and cathode of an electrochemical cell. As would be readily understood, the layers are not shown at any particular scale, and are intended merely to show the possible layers of cell material 310. As illustrated, cell material 310 may include a cathode current collector 307, which may be coupled with a cathode electrode material 309. In embodiments, cathode current collector 307 may be aluminum, and may also be alternative metals or conductive materials that may be stable at potentials above about 3 V, for example. Cathode current collector 307 may be coated or coupled with a cathode active material 309, which may include a lithium-containing compound in embodiments.

Cell material 310 may also include an anode current collector 311, which may be coupled with an anode electrode material 313. Anode current collector 311 may be copper in embodiments, and may also be alternative metals or conductive materials that may be stable at potentials below about 1 V, for example. Anode current collector 311 may be coated or coupled with anode active material 313, which may include a carbon-containing compound in embodiments. A separator 316 may be disposed between the electrodes, and may be a polymer film or a material that may allow lithium ions to pass through its structure while not otherwise conducting electricity.

Although illustrated as single layers of electrode material, cell material 310 may be any number of layers. Although the cell may be composed of one layer each of anode and cathode material as sheets, the layers may also be formed into a jelly roll design, or folded design, such that any number of layers may be included in cell material 310. For embodiments which include multiple layers, the tab portions of each anode current collector may be coupled together, as may be the tab portions of each cathode current collector.

Figure 4:
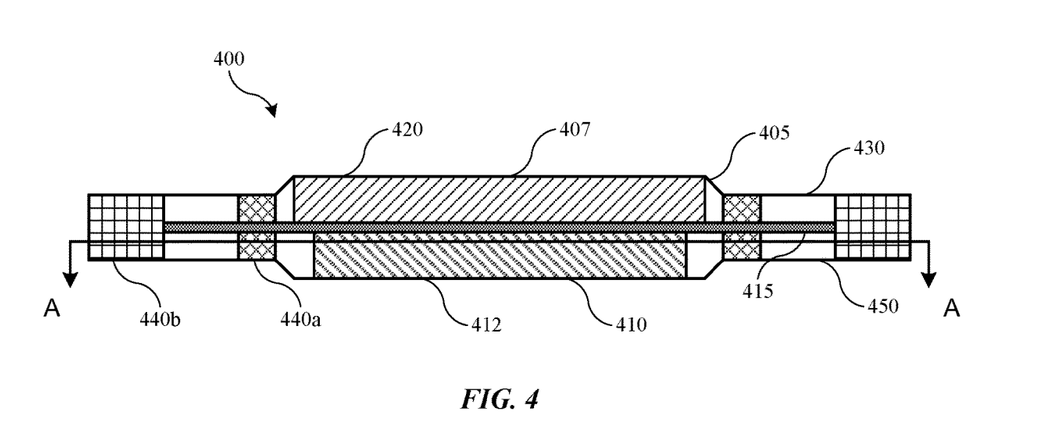
FIG. 4 shows a schematic cross-sectional view of a battery cell according to embodiments of the present technology.

Turning to FIG. 4 is shown a schematic cross-sectional view of a battery cell 400 according to embodiments of the present technology. Battery cell 400 may include aspects of any of the previously described battery cells of FIGS. 1 and 3. Battery cell 400 may be utilized in a variety of energy storage devices previously described, and may be part of a rolled, stacked, prismatic, or any other battery type. Battery cell 400 may include aspects of the present technology, which may allow overcurrent protection within the battery cell 400. Battery cell 400 may be used in a single cell or multi-cell battery, and when used in a multi-cell battery may be used with one or more additional battery cell 400 structures.

Battery cell 400 may include a first current collector 405 and a second current collector 410. Either current collector may be an anode current collector with the other operating as a cathode current collector. The current collectors may be similar or different materials in embodiments, and may be characterized by any of the previously described materials, including metals such as copper, aluminum, nickel, stainless steel, or other metals that may operate at anode or cathode potential, as well as non-metal or metal-containing materials, such as polymers or structures which may include an amount of conductivity to provide current either across or through the current collector. In embodiments in which the current collectors are utilized in a stacked structure, such as similar to those described with respect to FIG. 1, the current collectors may be characterized by an amount of xy-direction conductivity in addition to the z-direction conductivity. Although the xy-direction conductivity may be limited based on the cell operation, the xy-direction conductivity may assist electrical coupling of the regions of the battery cell 400 discussed in more detail below.

Battery cell 400 may also be characterized by different regions, which may include or contain the different operational structures within the battery cell. For example, battery cell 400 may include a first region 420, which may be at least partially defined from above by first current collector 405 and may be at least partially defined from below by second current collector 410. First region 420 may include electrode materials, and may include the active materials within the cell. The electrode materials may include a first active material 407 associated with first current collector 405, and may include a second active material 412 associated with second current collector 410. The active materials may be or include a cathode active material and an anode active material to be utilized in power functions of the cell.

The cathode active materials may include any of the previously described materials, and may include a lithium-containing material in embodiments, although any cathode active materials for primary or secondary batteries may be suitable with the present technology. Similarly, the anode active material may include any of the previously described materials, including a carbon-containing material, although again any anode active materials in primary or secondary batteries may be suitable with the present technology. As will be explained further below, first region 420 may contain the active materials within the cell, and in some embodiments, first active material 407 and second active material 412 may be limited to first region 420, and may not be included in other regions of the battery cell 400.

Battery cell 400 may also include a second region 430 in embodiments. Second region 430 may also be at least partially defined from above by first current collector 405, and may be at least partially defined from below by second current collector 410. Second region 430 may be adjacent first region 420, and in some embodiments, second region 430 may be fluidly isolated from the first region 420. While first region 420 may include the active cell materials in some embodiments, second region 430 may include active materials, although in some embodiments second region 430 may not include any active materials. Second region 430 may include an electrolyte within the second region, and the electrolyte in second region 430 may be a redox electrolyte in some embodiments.

Exemplary battery cells may include one or more other cell materials as previously described, and may include a separator 415. Separator 415 may be a polymeric material, and may be any of the materials previously described. Separator 415 may include a single film of material used within the battery cell 400, although in other embodiments separator 415 may include multiple separators including different materials utilized in different regions of the cell. The separator 415 may include multiple materials coupled together in embodiments, and may utilize different materials based on their compatibility with electrolyte materials within the first region 420 or the second region 430 in embodiments. In some embodiments, as illustrated, separator 415 may extend across battery cell 400. Separator 415 may extend through first region 420 and also extend into, across, or through second region 430 so as to extend through both the first region 420 and the second region 430. As noted above, in some embodiments, second region 430 may not include active materials. However, because first current collector 405 and second current collector 410 may extend across second region 430, an electronic barrier, such as separator 415, may be included within second region 430 to limit shorting between the two current collectors, which may be operating as positive and negative current collectors of battery cell 400.

Battery cell 400 may also include a seal 440 within the cell structure. Seal 440 may include a single seal having defined characteristics discussed below, or may include multiple seals. For example, a first seal 440a may be included between the first region 420 and the second region 430 in embodiments. First seal 440a may provide the fluid isolation as well as electrical isolation between the first region 420 and the second region 430 in embodiments. First seal 440a may at least partially define one or both of the first region 420 and the second region 430. As illustrated, although second region 430 may be located in a variety of positions relative to first region 420, in some embodiments second region 430 may be positioned laterally external to the first region 420 within battery cell 400. First seal 440a may be positioned to define sidewalls of one or both of first region 420 and second region 430. For example, as illustrated, first seal 440a may define an exterior sidewall of first region 420. First seal 440a may also define an interior sidewall of second region 430.

Separator 415 may extend across first seal 440a in embodiments, and first seal 440a may include a two-part design to accommodate separator 415. For example, a first part of first seal 440a may be coupled with first current collector 405, and a second part of first seal 440a may be coupled with second current collector 410. During fabrication, separator 415 may be positioned between the first part and the second part of first seal 440a, for example, and the materials may be sealed together in one or more ways, such as by heat pressing the materials together. This may allow separator 415 to extend across both first region 420 and second region 430, while allowing a fluid seal to be formed between the two regions with separator 415.

Battery cell 400 may also include a second seal 440b, which may define an exterior of second region 430. Second seal 440b may be part of first seal 440a to produce a single seal for the cell, although in some embodiments second seal 440b may be a separate component from first seal 440a. Second seal 440b may define an exterior of battery cell 400 as well, and may provide a hermetic seal for the battery cell to prevent both ingress of vapor as well as egress of electrolyte, gases, or other materials from the cell. Second seal 440b may be the same material or materials as first seal 440a, although in other embodiments second seal 440b may be a different material from first seal 440a. For example, first seal 440a and second seal 440b may perform different functions within the cell, for which different materials may facilitate the individual functions. For example, first seal 440a may include materials that may be compatible with active materials and electrolyte materials of first region 420 as well as electrolyte materials of second region 430. Second seal 440b may include materials that may be compatible with electrolyte materials of second region 430, and may also provide decreased water permeability to enable improved protection from water ingress to battery cell 400.

Second seal 440b may also be or include a two part design, and may include or be part of the two parts of first seal 440a. For example, separator 415 may extend through second seal 440b as well in some embodiments, and may extend fully through battery cell 400. Second seal 440b may include a first part coupled with first current collector 405, which may or may not be a single piece of material including a first part of first seal 440a as well. Similarly, second seal 440b may include a second part coupled with second current collector 410, which also may or may not be a single piece of material including a second part of second seal 440b as well. A number of combinations of seal materials 440 have been described, and it is to be understood that any number of combinations or differentiations based on this discussion are similarly encompassed by the present technology.

Figure 5A:
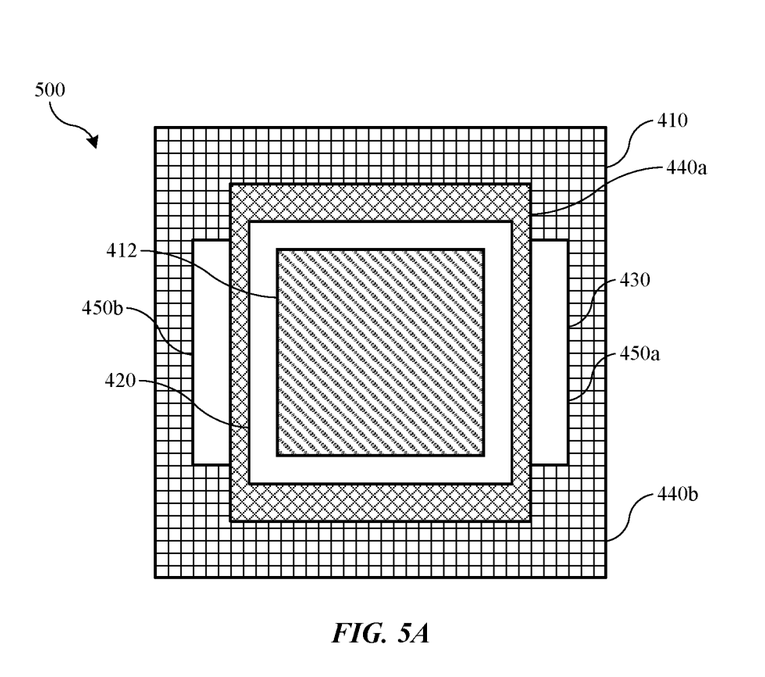
FIGS. 5A-5B show cross-sectional views along line A-A of FIG. 4 of a battery cell according to embodiments of the present technology.
Figure 5B:
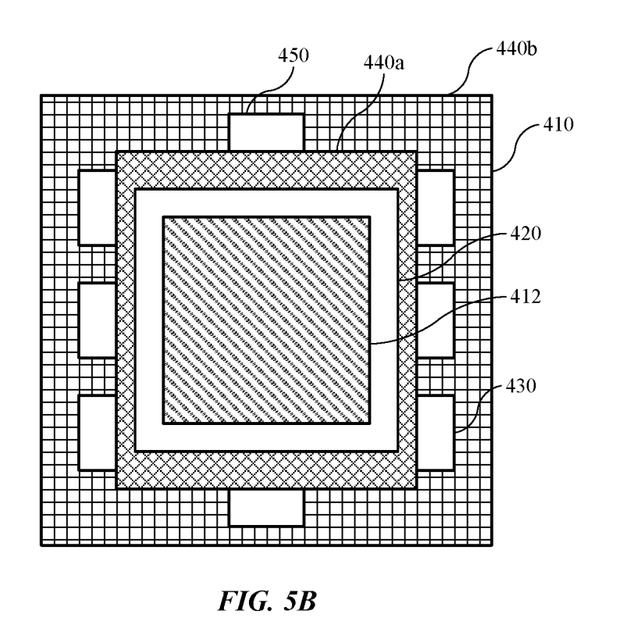

Seal 440 with first current collector 405 and second current collector 410 may define a cavity 450 within second region 430 of battery cell 400. Cavity 450 may be characterized by a number of shapes and volumes. Additionally, separator 415 materials may be formed or located to define a plurality of cavities 450 throughout the battery cell 400, which may be located about or external to first region 420 of battery cell 400. Turning to FIGS. 5A-5B is shown cross-sectional views along line A-A of FIG. 4 of a battery cell 500 according to embodiments of the present technology. Battery cell 500 may include any of the aspects of battery cell 400 as previously described, and may also include any of the aspects of the batteries and components discussed previously with respect to FIGS. 1 and 3, for example. As illustrated, the cross-sectional view is provided below separator 415, which may be above the view illustrated. However, separator 415 may be included in any fashion as previously discussed, and may be included across the entire area of battery cell 500, and may extend past one or more outer edges of the cell.

As shown in the plan view cross-sectional schematic of FIG. 5A, battery cell 500 may include a current collector 410 on which a number of components may be positioned, or with which the materials may be coupled. An active material 412 may be positioned on current collector 410, and may be included in a first region 420 of battery cell 500. Additionally, a seal material 440 may be positioned on current collector 410. As previously discussed, seal material 440 may be a single piece across current collector 410, or may be or include two or more pieces which may define one or more cavities 450 along second region 430 of current collector 410. The embodiment illustrated in FIG. 5A includes two elongate cavities 450a, 450b distributed on opposite sides of first region 420. The cavities 450 may be any length or shape, and in some embodiments may be a single form extending around the entire circumference of first region 420.

FIG. 5B shows an additional structural configuration of battery cell 500 in which an additional array of cavities 450 may be included. As illustrated in FIG. 5B, the battery cell includes current collector 410 on which an active material 412 is positioned in first region 420. Additionally, the cell may include one or more seal materials 440 in second region 430. The seal materials 440 may define cavities 450 about first region 420. As shown, the cavities 450 are distributed about first region 420, and may be arranged with seal materials 440 to be fluidly separate from one another. As will be explained below, this may afford tuning of the electrolyte materials within the cavities 450 in second region 430.

As noted previously, the first region 420 of the battery cells 400, 500 may include electrode materials, and may also include a first electrolyte, which may include one or more salts, solvents, and other materials or additives. In embodiments, the first electrolyte may not include any of the redox additives discussed previously, which may avoid the issues discussed previously. The materials within the first electrolyte may be any one of many known materials used in electrolytes for secondary or rechargeable batteries, which may include lithium-ion batteries as well as any other type of rechargeable battery that may use an electrolyte. For example, such as with a lithium-ion battery, the first electrolyte may include one or more lithium salts dissolved in one or more solvents, which may be non-aqueous in embodiments, and may include organic solvents. For example, the salts may include $LiPF_6$, $LiBF_4$, or $LiClO_4$, among other lithium-containing materials. Exemplary solvents may include, for example, ethylene carbonate, dimethyl carbonate, diethyl carbonate, propylene carbonate, and other organic solvents. By utilizing these materials without redox additives, the electronic capabilities of the cell may be maintained at higher efficiency than when additional materials are incorporated within the first electrolyte.

The cavities defined within the second region 430 of each battery cell 400, 500, may include a second electrolyte. The second electrolyte may be different from the first electrolyte, and the second electrolyte may be or include a redox electrolyte in embodiments, and may be configured to operate during overcurrent events. The second electrolyte may include similar or different solvents as the first electrolyte, and may or may not include lithium-containing compounds or other metal salts as may be utilized in the first electrolyte to promote cell activity. For example, some embodiments of the second electrolyte may not include lithium-containing compounds, similar to the first electrolyte, which may not include any of the second electrolyte components discussed here. The second electrolyte components may include one or more organometallic compounds, and may include components having one or more aromatic rings or aryl groups in embodiments. For example, the components may include one or more phenyl groups, or substituted aromatic compounds. The substitutions may include nitrogen or other elements. Exemplary compounds that may be utilized in the present technology include dihydrophenazine, dimethoxybenzene, derivatives of such, or other compounds including one or more methoxy groups, ferrocene or other metallocenes, thiantlurene, phenothiazine or other sulfur, halogen, acetyl, or alkyl containing materials. By utilizing such compounds, the voltage limits of the produced electrolyte may be tuned above 4.0 V vs. $Li/Li^+$.

Some of the compounds may include high-molecular weight compounds, which as previously discussed may reduce the efficiency of the electrolyte in the standard cell, but which may be beneficial in separate cavities within the battery cell structure. Utilizing different compounds or different combinations of compounds may allow the second electrolyte to be oxidized at particular voltages. For example, the second electrolyte may be tuned to be oxidized above 4.0 V, which may allow the material to remain passive below 4.0 V, or during standard operation of the cell. Accordingly, current delivered to and from the battery cell may be provided through the first section of the cell in which the electrode materials may reside. The first electrolyte may allow oxidation to occur during a voltage window below or about 4.3 V, and may operate within a voltage window below or about 4.2 V, below or about 4.1 V, below or about 4.0 V, below or about 3.9 V, below or about 3.8 V, below or about 3.7 V, below or about 3.6 V, below or about 3.5 V, below or about 3.4 V, below or about 3.3 V, or lower depending on the composition of the cell components.

The second electrolyte may remain passive within these voltage ranges, and may not be electrically active. Once the voltage exceeds a threshold to begin oxidation of components within the second electrolyte, current may be shunted from the first region into the second region where the second electrolyte may reside. The first current collector and the second current collector may electrically couple the first region and the second region, which may allow current to be consumed within either region of the battery cell. One or more components of the second electrolyte may become electrically active, or may begin to oxidize, at a voltage window above or about 3.5 V, and may begin to oxidize above or about 3.6 V, above or about 3.7 V, above or about 3.8 V, above or about 3.9 V, above or about 4.0 V, above or about 4.1 V, above or about 4.2 V, above or about 4.3 V, above or about 4.4 V, above or about 4.5 V, or higher in embodiments. Below any of these ranges, the second electrolyte may be configured to remain passive in embodiments. The redox reactions may be faster occurring within the second electrolyte, which may allow the material to continue to shunt current away from the first region until the overcharge situation has finished or been resolved. The redox reaction occurring within the second electrolyte may be considered a controlled short within the second region, where the reversible shuttling converts the overcharge current into heat to be dissipated from the battery cell. This may allow the battery cell to avoid performing the reactions at the electrodes at high voltage, which may degrade the materials within the cell.

The second electrolyte may be configured to begin oxidation at or within any of the ranges discussed above. In some embodiments, different configurations of the second electrolyte may be included in different cavities of the battery cell in order to provide further tuning during overcurrent scenarios. For example, referring back to FIG. 5A, in some embodiments the second electrolyte contained in cavity 450a may be differently tuned from the second electrolyte contained in cavity 450b. Both of the second electrolytes may be configured to remain passive at operating voltages below or about 4.0 V, and may begin oxidation at voltages above or about 4.0 V. Either of the second electrolytes may be tuned to begin oxidation in any of the ranges discussed above. For example, the electrolyte in cavity 450a may be configured to remain passive at operating voltages below or about 4.0 V, and may begin oxidation reactions to shunt current above or about 4.0 V. Additionally, the electrolyte in cavity 450b may be configured to remain passive at operating voltages below or about 4.3 V, and may begin oxidation reactions to shunt current above or about 4.3 V. Alternatively, the electrolyte in cavity 450a may electrically activate at 4.3 V, and the electrolyte in cavity 450b may electrically activate at 4.5 V. Any additional amounts and ranges may be used as well and are understood to be encompassed by the present technology.

By utilizing a range that may be above normal operating ranges by a certain amount, unnecessary shunting may be avoided during normal operating fluctuations, and shunting may be reserved for actual overcurrent events to maintain full efficiency of the battery cell. By utilizing differently tuned amounts of the second electrolyte, a first portion of the second electrolyte may be utilized as an overcurrent event begins, and a second portion of the second electrolyte may be reserved for scenarios of additional overcurrent events or in the event of the overcurrent event deteriorating to a greater degree. Additionally, such as with structures illustrated in FIG. 5B in which more cavities are defined about the second region, each amount may be differently tuned in a variety of ways from the second electrolyte included in one or more other regions to provide multiple protection levels activated at different voltage levels.

Figure 6A:
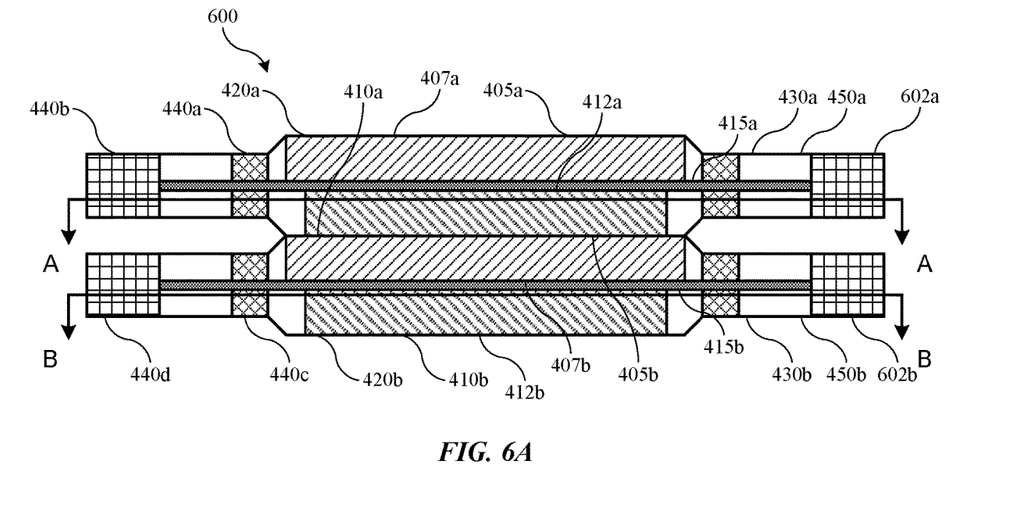
FIGS. 6A-6C show schematic views of battery cells according to embodiments of the present technology.
Figure 6B:
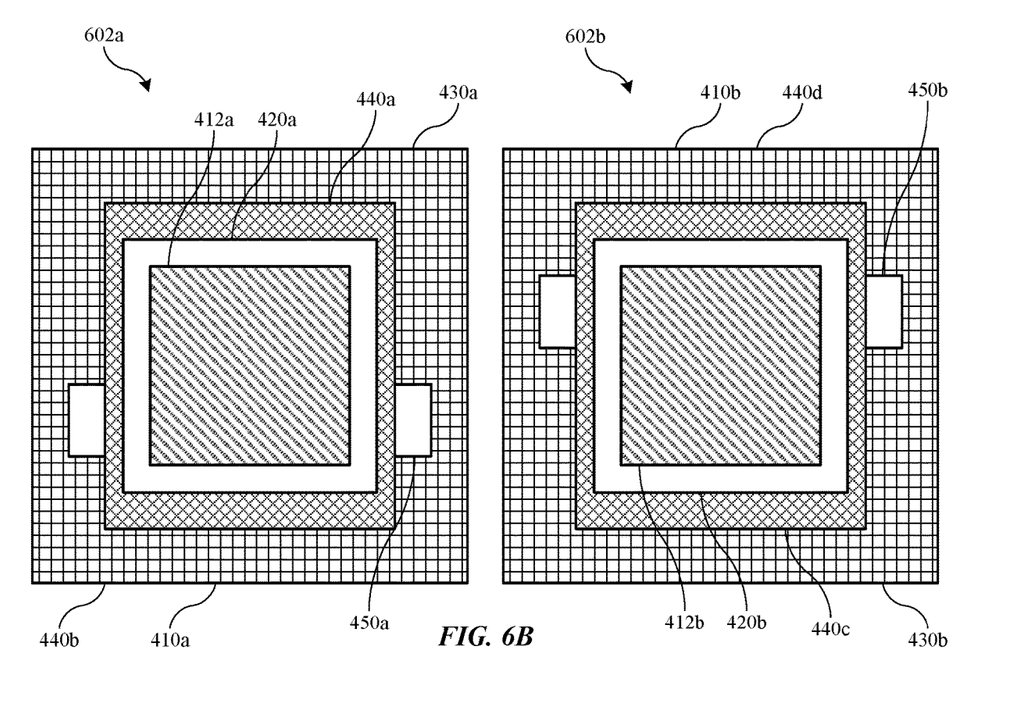
Figure 6C:
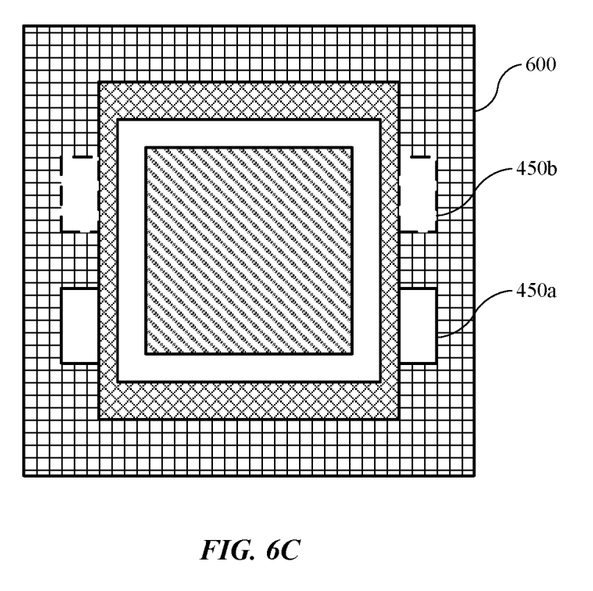

The battery cells of the present technology may also be utilized in combination with other battery cells that may be similar or also include a second electrolyte according to the present technology. Turning to FIGS. 6A-6C is shown schematic views of battery 600, which may be similar to batteries discussed with respect to FIGS. 1 and 3 as well as other battery designs that may utilize the present technology. Battery 600 may include a first battery cell 602a and a second battery cell 602b according to embodiments of the present technology. Battery cells 602a and 602b may be similar to any of the battery cells previously discussed, and may show a configuration of multiple cells in a battery according to the present technology. The battery 600 may include cells 602 and may include any number of cells as previously described. Battery cells 602 may each include similar components as discussed previously with respect to FIG. 4.

For example, as shown in FIG. 6A, battery cell 602a may include a first current collector 405a and a second current collector 410a. Battery cell 602b may include a third current collector 405b and a fourth current collector 410b. For example, current collector 405 may be a cathode current collector, and current collector 410 may be an anode current collector, although in other embodiments the current collectors may be reversed. A first active material 407, which may be a cathode active material, may be in contact with the first current collector 405. A second active material 412, which may be an anode active material, may be in contact with the second current collector 410. Battery cells 602 may include a seal material 440 as previously described, which may be configured to separate battery cell 602a into a first region 420a and a second region 430a, and separate battery cell 602b into a third region 420b and a fourth region 430b. Seal material 440 may maintain the second region 430a and fourth region 430b fluidly isolated from the first region 420a and the third region 420b.

The battery electrode materials may be limited to the first region 420, which may be an interior region, and the second region may include a redox electrolyte, which may be an exterior region, in embodiments as previously discussed. Seal material 440 may include a first portion of the seal material, such as portions 440a and 440c, and a second portion of the seal material, such as portions 440b and 440d, which may define one or more cavities 450 as previously described. Each battery cell 602 may also include a separator 415 disposed between the current collectors in any of the configurations previously described. For example, a first separator 415a may extend across the first region and the second region, and a second separator 415b may extend across the third region and the fourth region. The separators may be similar or different materials, and may include any of the materials previously identified. In embodiments, the first current collector and second current collector may electrically couple the first region and the second region, and the third current collector and the fourth current collector may electrically couple the third region and the fourth region to allow the current shunting as previously described. In embodiments, the second region may be fluidly isolated from the fourth region, and in embodiments each region may be fluidly isolated from any other region.

FIG. 6B illustrates cross-sectional views of battery cells 602a-b along lines A-A and B-B of FIG. 6A. These views may illustrate additional configurations of cavities 450 within the individual battery cells. The plan view of battery cell 602a may include a view of second current collector 410a. The cell may include a first region 420a in which active material 412a may be positioned. The cell may include one or more seal materials 440a-b, which may at least partially define one or more cavities 450a in second region 430a. Similarly, battery cell 602b may include current collector 410b, which may include a third region 420b in which active material 412b may be positioned or disposed. Battery cell 602b may also include one or more seal materials 440c-d, which may at least partially define one or more cavities 450b in fourth region 430b.

The cavities 450a of battery cell 602a may be similar or different from the cavities 450b of battery cell 602b. For example, the cavities may be the same size or different sizes in embodiments. Cavities 450 may include the redox electrolyte, which may be similar to the second electrolyte previously discussed. The electrolyte may be the same or different between cells, and may be tuned to the same or different voltage, for example. Additionally, the redox electrolytes may include multiple tuned portions of electrolyte distributed throughout multiple cavities of each battery cell. In some embodiments each battery cell 602 may be formed similarly to one another. In other embodiments, cavities in a first battery cell may be offset from cavities in a second battery cell. For example, as illustrated, cavities 450a may be offset from cavities 450b, which may reduce contact between the associated current collectors or regions of the battery cells.

FIG. 6C illustrates a plan view through line A-A of battery 600, which shows cavities 450b in hidden view through the structure. The figure illustrates that cavities 450b may be vertically offset from cavities 450a in some embodiments. This may reduce or prevent contact between these regions of the battery compared to directly in line cavities. In other embodiments, the cavities may be in line, and the battery cells may be identical to one another to facilitate fabrication. The cavities in which the redox electrolyte is contained may not be characterized by the same thickness as the first region of the battery cells where the electrode active materials are contained, which may similarly prevent or reduce contact between current collectors in the second region.

When multiple cells or all cells in an exemplary battery include regions including the second electrolyte, or shuttle electrolyte, the battery configuration may afford additional balancing capabilities. In batteries including multiple cells, over time one or more cells may weaken compared to other cells, and may under charge or over discharge. Balancing the cells relative to one another may protect the cells from detrimental effects over time. The present technology may allow balancing at regular intervals utilizing the redox electrolyte to enable additional charging to assist balancing a weaker cell.

Figure 7:
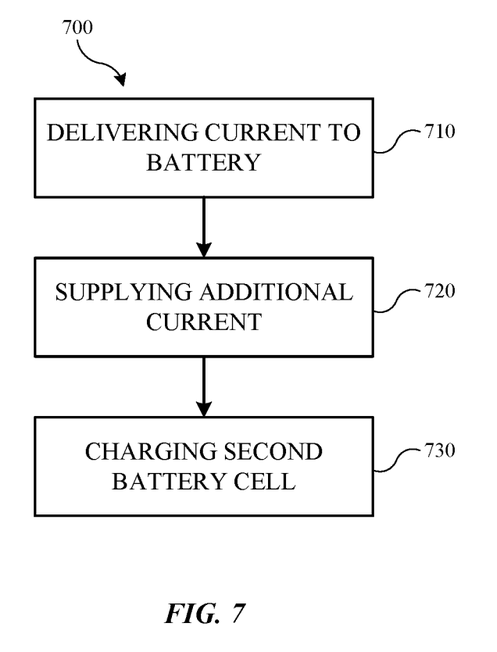
FIG. 7 shows operations of a method of balancing battery cells according to embodiments of the present technology.

FIG. 7 shows operations of a method 700 of balancing battery cells according to embodiments of the present technology. The method may include delivering current to a battery from a voltage source at operation 710, such as during charging. The battery may include multiple cells, and may be similar to battery 600 or any other battery previously described. The battery may include at least two cells having characteristics of the previously discussed cells, and may include a redox electrolyte in distinct regions of the battery cells. The battery cells may be out of balance, and a first cell of the battery may be characterized by a charge level higher than a second cell of the battery. The present technology may utilize the redox electrolytes at intervals of charging to ensure each cell within the battery is similarly charged. For example, the balancing may be performed when a particular cell registers a voltage indicating it is out of balance, or the balancing operation may be performed every charge, or may be performed after a number of charges greater than or about 2 charges, greater than or about 5 charges, greater than or about 10 charges, greater than or about 25 charges, greater than or about 50 charges, greater than or about 100 charges, greater than or about 200 charges, or more.

When performed, the method may include supplying additional current to the battery cells at operation 720. The operation may occur when the first battery cell has reached full charge, and the voltage begins to rise within the cell. As the additional current continues to be delivered to the battery, the first battery cell may reach a voltage level at which the redox electrolyte begins oxidation in order to protect the electrode materials within the cell. The redox electrolyte within the first battery cell may shunt current from the electrode materials in the first battery cell while the second battery cell characterized by a lower charge level is brought into balance. By shunting the additional current delivered, the first battery cell may be maintained at a voltage threshold of the redox electrolyte, which may limit the voltage within the first battery cell from continuing to rise. This may occur until the second battery cell is brought into balance. For example, the additional current may be delivered, and the second battery cell may be charged to a level associated with a fully charged battery cell at operation 730. When all battery cells within the battery read a voltage level indicating full charge or a voltage level activating the redox electrolyte, the charging operation may be ceased as all batteries may be in balance again. By utilizing the redox electrolytes in the structures described, overcurrent protection may be provided, while cell performance may be maintained by fluidly isolating the redox electrolyte from the electrolyte in contact with the electrode active materials.

Figure 8:
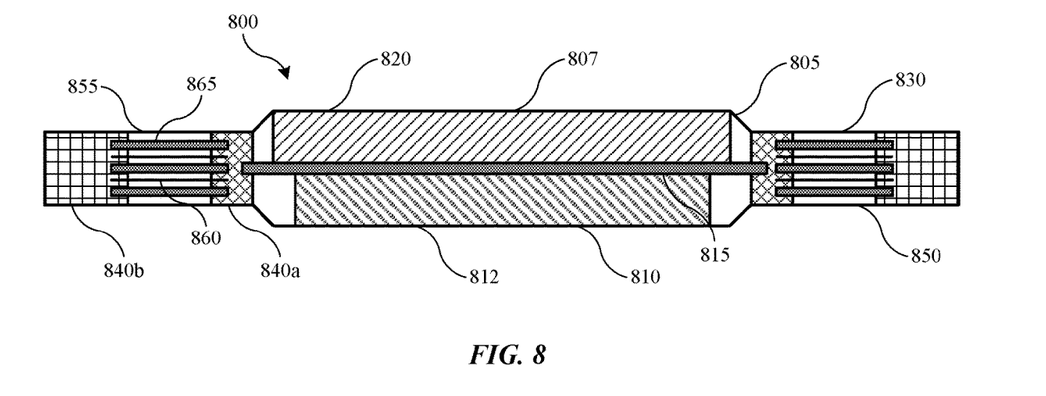
FIG. 8 shows a schematic cross-sectional view of a battery cell according to embodiments of the present technology.

Turning to FIG. 8 is shown a schematic cross-sectional view of a battery cell 800 according to embodiments of the present technology. Battery cell 800 may include aspects of any of the previously described battery cells including FIG. 4. Battery cell 800 may be utilized in a variety of energy storage devices previously described, and may be part of a rolled, stacked, prismatic, or any other battery type. Battery cell 800 may include aspects of the present technology, which may allow overcurrent protection within the battery cell 800. Battery cell 800 may be used in a single cell or multi-cell battery, and when used in a multi-cell battery may be used with one or more additional battery cell 800 structures.

As illustrated, battery cell 800 may include multiple components previously described. For example, battery cell 800 may include a first region 820, which may include a first active material 807 and a second active material 812 as previously described. The active materials may be included between a first current collector 805 and a second current collector 810. Separating the active materials may be a first separator 815. Battery cell 800 may also include a second region 830 in embodiments. Second region 830 may also be at least partially defined from above by first current collector 805, and may be at least partially defined from below by second current collector 810. Second region 830 may be adjacent first region 820, and in some embodiments, second region 830 may be fluidly isolated from the first region 820 with seal material 840 as previously described, which may include first seal 840*a* providing fluid isolation between first region 820 and second region 830. Second seal 840*b* may be a part of first seal 840*a* and may define an exterior of battery cell 800, all as previously described, although second seal 840*b* may also be separate from first seal 840*a* in embodiments.

Seal 840 may at least partially define a cavity 850, which may include a redox electrolyte as previously described. Battery cell 800 may include multiple redox sections compared to other embodiments. For example, as discussed above, the redox electrolyte may provide an amount of overcurrent protection during operation when cell voltage exceeds a defined threshold for the redox electrolyte. When a single redox electrolyte material is utilized in some embodiments, the materials available having operational ranges as discussed above may be limited. For example, at a desired overcurrent protection above 4.0 V, or any other voltage previously noted, fewer materials may be characterized by activation at or above this range. However, battery cell 800 illustrates an exemplary second region 830 including multiple redox electrolyte sections configured in series. Such a configuration may allow additional materials to be utilized by dividing the threshold voltage by the number of redox sections included in series within each cavity.

For example, second region 830 may include three redox sections 855, although in embodiments second region 830 may include two, three, four, five, six, or more redox sections. By utilizing multiple redox sections coupled in series between first current collector 805 and second current collector 810, the threshold voltage to perform shuttling may be divided accordingly. For example, for a battery cell characterized by a threshold voltage for shuttling of 4.2 V, when three redox sections are utilized in series, each may be configured for a voltage of 1.4 V, which may allow a greater variety of materials to be used. Because the redox sections 855 may be coupled in series with one another, and in parallel with first region 820, the redox sections may not operate until the voltage exceeds the additive voltage of the sections, limiting the redox shuttling to operational situations above the desired threshold voltage.

To form a number of serially connected redox sections 855, cavity 850 may include additional electrode components, such as redox electrodes 860, which may divide the individual redox sections. Each redox section may also include a redox separator 865, which may ensure shorting does not occur across the redox sections. Redox electrodes 860 may include any electrode component previously described, and may include stainless steel in some embodiments, although materials may also be selected at least in part based on the redox shuttle electrolyte materials. Additional components may be included such as copper, aluminum, silver, and any transition metal or transition metal compound that may operate at potentials sought for the cell, as well as any material previously described. The redox electrodes 860 and redox separators 865 may be included within cavity 850, and may be incorporated within seal 840 to ensure fluid separation between each redox section 855.

Redox electrodes 860 may be operated as bipolar electrodes between each redox section 855, where there may not be a direct electrical connection with redox electrodes 860 between current collectors 805, 810. This may allow electrical separation of each section across the cavity, producing a series electrical coupling across the cavity between the first current collector 805 and the second current collector 810. Additionally, each redox section 855 may include separate redox electrodes as illustrated in FIG. 9.

Figure 9:
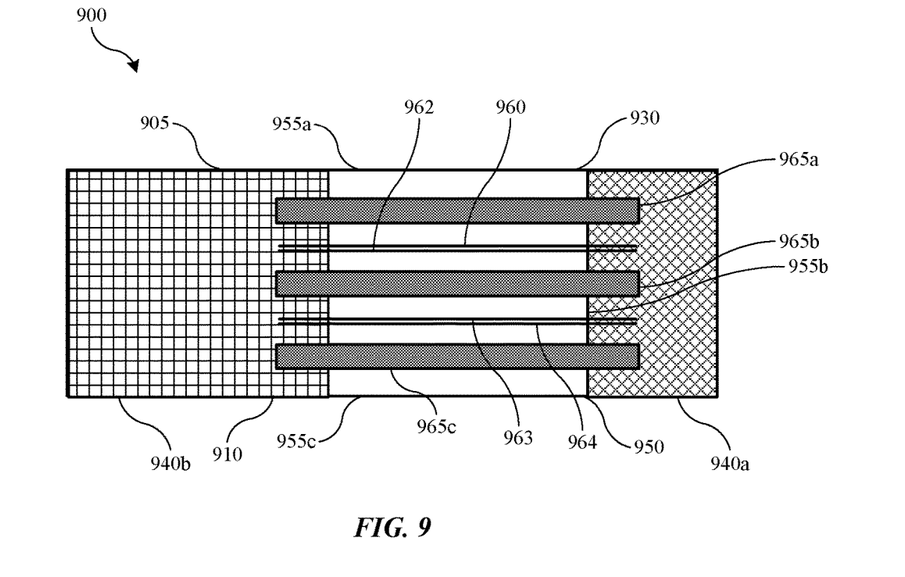
FIG. 9 shows a schematic cross-sectional view of a portion of a battery cell according to embodiments of the present technology.

FIG. 9 illustrates a partial cross-sectional view of a battery cell 900 according to embodiments of the present technology. Battery cell 900 may include components similar to any of the previously described battery cells, including FIG. 8 illustrating multiple redox sections. Battery cell 900 may illustrate a portion of second region 930 of battery cell 900. It is to be understood that the battery cell may also include any of the components previously described, and may include a first section similar to any first section including active materials. Battery cell 900 may include a first current collector 905 and a second current collector 910. Battery cell 900 may also include a seal 940 including a first seal 940a, which may separate second region 930 from a first region not shown, and a second seal 940b contributing to an exterior of battery cell 900. First seal 940a and second seal 940b may or may not be joined or be part of the same seal material in embodiments, such as previously described.

Defined by seal 940 may be a cavity 950, which may be similar to any of the cavities previously described in which a redox shuttle electrolyte may be contained. Battery cell 900 illustrates three redox sections 955, although it is to be understood that any number of redox sections may be included based on the threshold voltage for redox shuttling of an incorporated electrolyte. Each redox section may include at least one internal electrode in the series operation. While FIG. 8 illustrated a bipolar internal electrode 860 separating the redox sections, battery cell 900 may include coupled electrodes between each redox section.

For example, and based on the exemplary three redox sections illustrated, a first redox section 955a may extend from current collector 905 to first internal electrode 960. Separator section 965a may extend within the redox section to limit or prevent shorting between the current collector 905 and the electrode 960. Electrode 960 may be electrically coupled with a second internal electrode 962, which may form part of second redox section 955b. In some embodiments electrode 960 and electrode 962 may be directly connected or coupled, while in other embodiments a layer of material may be disposed between the electrodes. Redox section 955b may extend to a third internal electrode 963, which may form the electrical boundary for redox section 955b. A second separator section 965b may be included within redox section 955b. Third internal electrode 963 may be electrically coupled with a fourth internal electrode 964, which may at least partially define a third redox section 955c. Third redox section 955c may extend from the fourth internal electrode 964 to second current collector 910, which may complete the series configuration of the redox sections. Similar to the other redox sections, third redox section 955c may include a separator material 965c between the electrodes. It is to be understood that the redox sections 955 may be extended to any number of redox sections to produce a series threshold redox shuttling voltage based on the redox shuttle electrolyte utilized within the system.

Because the multiple redox sections may divide the threshold redox shuttling voltage by the number of cells included, a number of additional redox shuttling electrolytes may be utilized in accordance with the present technology. Accordingly, the electrolytes may include aqueous electrolytes, as well as a variety of acids, including one or more ions of various materials. For example, exemplary electrolyte materials may include one or more solutions including one or more elements of bromine, chlorine, iodine, chromium, nitrogen, oxygen, mercury, or other materials that may provide a redox potential that when included in a number of series redox sections may provide a threshold redox shuttling reaction to provide overcurrent protection to the battery cell.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery cell comprising:
    a first current collector;
    a second current collector;
    a first region defined between the first current collector and the second current collector, wherein the first region contains electrode materials;
    a second region defined between the first current collector and the second current collector, wherein the second region is fluidly isolated from the first region, wherein the second region includes an electrolyte, and wherein the electrode materials comprise a cathode active material and an anode active material contained within and limited to the first region.

2. The battery cell of claim 1, further comprising a separator extending through both the first region and the second region.

3. The battery cell of claim 1, further comprising a seal at least partially defining the first region and the second region.

4. The battery cell of claim 3, wherein the second region is positioned laterally external to the first region, and wherein the seal defines an exterior of the first region and an interior of the second region.

5. The battery cell of claim 3, wherein the seal defines sidewalls of the second region.

6. The battery cell of claim 5, wherein, with the first current collector and the second current collector, the seal defines a cavity within the second region.

7. The battery cell of claim 6, wherein the seal defines a plurality of separate cavities fluidly isolated from one another and located external to the first region.

8. The battery cell of claim 1, wherein the first region includes a first electrolyte, and wherein the second region includes a second electrolyte different from the first electrolyte.

9. The battery cell of claim 8, wherein the second electrolyte is configured to remain passive at operating voltages below or about 4.0 V.

10. The battery cell of claim 9, wherein the second electrolyte is configured to be electrically activated at operating voltages above or about 4.0 V.

11. The battery cell of claim 10, wherein the second region defines a plurality of separate cavities fluidly isolated from one another, wherein a first fluid cavity of the plurality of fluid cavities contains an electrolyte configured to remain passive at operating voltages below or about 4.0 V, and wherein a second fluid cavity of the plurality of fluid cavities contains an electrolyte configured to remain passive at operating voltages below or about 4.3 V.

12. The battery cell of claim 1, wherein the first current collector and the second current collector electrically couple the first region and the second region.

13. A battery cell comprising:
a first current collector;
a second current collector;
a separator extending between the first current collector and the second current collector, wherein the separator faces the first current collector along a first surface of the separator, and wherein the separator faces the second current collector along a second surface of the separator opposite the first surface of the separator;
a first region defined between the first current collector and the second current collector, wherein the first region contains cathode and anode electrode active materials;
a second region defined between the first current collector and the second current collector, wherein the second region is fluidly isolated from the first region, wherein the second region extends laterally outward of the first region along the first surface of the separator, and wherein the second region includes an electrolyte.

14. The battery cell of claim 13, wherein the electrolyte in the second region is a second electrolyte, wherein the first region comprises a different electrolyte from the second region, and wherein the second electrolyte is configured to remain passive at operating voltages below or about 4.0 V.

15. The battery cell of claim 13, further comprising a seal at least partially defining the first region and the second region along each of the first surface and the second surface of the separator.

16. The battery cell of claim 15, wherein the second region is positioned laterally external to the first region, and wherein the seal defines an exterior of the first region and an interior of the second region.

17. The battery cell of claim 15, wherein the seal defines sidewalls of the second region.

18. The battery cell of claim 17, wherein, with the first current collector and the second current collector, the seal defines a cavity within the second region.

19. The battery cell of claim 18, wherein the seal defines a plurality of separate fluid cavities fluidly isolated from one another and located external to the first region.

20. The battery cell of claim 19, wherein a first fluid cavity of the plurality of fluid cavities contains an electrolyte configured to remain passive at operating voltages below or about 4.0 V, and wherein a second fluid cavity of the plurality of fluid cavities contains an electrolyte configured to remain passive at operating voltages below or about 4.3 V.

* * * * *